United States Patent
Vanderheyden et al.

[11] Patent Number: 6,154,342
[45] Date of Patent: *Nov. 28, 2000

[54] DATA STORAGE TAPE CARTRIDGE WITH REINFORCING TAPE REEL LOCK

[75] Inventors: William J. Vanderheyden, River Falls, Wis.; G. Phillip Rambosek, Schafer, Minn.; David T. Hoge, Westminster, Colo.

[73] Assignees: Imation Corp., Oakdale, Minn.; Storage Technology Corp., Louisville, Colo.

[*] Notice: This patent issued on a continued prosecution application filed under 37 CFR 1.53(d), and is subject to the twenty year patent term provisions of 35 U.S.C. 154(a)(2).

[21] Appl. No.: 09/095,741

[22] Filed: Jun. 11, 1998

[51] Int. Cl.$^7$ .................................................. G11B 23/087
[52] U.S. Cl. ..................... 360/132; 242/338.1; 242/611
[58] Field of Search ........................ 360/132; 242/338.1, 242/338.3, 345, 345.2, 611

[56] References Cited

U.S. PATENT DOCUMENTS

| | | | |
|---|---|---|---|
| 3,836,096 | 9/1974 | Fukushima et al. | 242/197 |
| 3,857,531 | 12/1974 | Jantzen | 242/197 |
| 4,267,986 | 5/1981 | Uemura et al. | 242/199 |
| 4,561,610 | 12/1985 | Gyi | 242/198 |
| 4,581,667 | 4/1986 | Gerfast | 360/97 |
| 4,608,617 | 8/1986 | Oishi et al. | 360/133 |
| 4,775,115 | 10/1988 | Gelardi | 242/195 |
| 4,819,889 | 4/1989 | Satoh | 242/199 |
| 5,027,249 | 6/1991 | Johnson et al. | 360/132 |
| 5,209,425 | 5/1993 | Krabbenhoft et al. | 242/197 |
| 5,297,755 | 3/1994 | Felde et al. | 242/199 |
| 5,316,235 | 5/1994 | East et al. | 242/199 |
| 5,513,815 | 5/1996 | Erickson et al. | 242/346 |
| 5,547,142 | 8/1996 | Cheatham et al. | 242/338.1 |
| 5,564,647 | 10/1996 | Bay et al. | 242/608.8 |

FOREIGN PATENT DOCUMENTS

| | | |
|---|---|---|
| 284687 | 10/1988 | European Pat. Off. . |
| 366368 | 5/1990 | European Pat. Off. . |
| 575904 | 12/1993 | European Pat. Off. . |
| 0 588 219 A2 | 3/1994 | European Pat. Off. . |
| 0 747 900 A1 | 12/1996 | European Pat. Off. . |
| 772 197 | 5/1997 | European Pat. Off. . |
| 2 126 561 | 3/1984 | United Kingdom . |
| 2236092 | 3/1991 | United Kingdom . |
| 87/07424 | 12/1987 | WIPO . |

OTHER PUBLICATIONS

IBM Technical Disclosure Bulletin, Mar. 1986, vol. 28, No. 10, p. 4552.

*Primary Examiner*—William R. Korzuch
*Attorney, Agent, or Firm*—Dicke, Billing & Czaja, P.A.

[57] ABSTRACT

A data storage tape cartridge having a reinforcing tape reel lock. The data storage tape cartridge includes a housing defined by a first housing section and a second housing section, a hub pin extending from an interior surface of the first housing section, a tape reel assembly rotatably maintained by the hub pin and a storage tape wrapped about the tape reel assembly. The tape reel assembly includes a hub, opposing tape flanges and a brake body. The hub includes a tape receiving portion interiorly secured to a post, the post defining an axial bore sized to receive the hub pin. The brake body is retractably associated with an axial end of the hub and includes a braking surface and an interior support surface. The braking surface is configured for selective engagement with the second housing section. The interior support surface is configured to abut the post of the hub. In a locked position, the brake body prevents rotation of the hub and limits side-to-side movement of the post, and thus side-to-side deflection of the hub pin.

21 Claims, 7 Drawing Sheets

DATA STORAGE TAPE CARTRIDGE WITH REINFORCING TAPE REEL LOCK

BACKGROUND OF THE INVENTION

The present invention relates to a data storage tape cartridge. More particularly, it relates to a tape reel portion of a data storage tape cartridge.

Data storage tape cartridges have been used for decades in the computer, audio and video fields. While other forms of media storage, such as disk cartridges, are also available, the data storage tape cartridge continues to be an extremely popular form of recording large volumes of information for subsequent retrieval and use.

The data storage tape cartridge generally consists of an outer shell or housing maintaining at least one tape reel and a length of magnetic storage tape. The storage tape is wrapped around a hub portion of the tape reel and is driven through a defined tape path by a driving system. The housing normally includes a separate cover and a base, the combination of which creates an opening (or window) of some type for allowing access to the storage tape by a read/write head upon inserting the data storage tape cartridge into a tape drive. This interaction between storage tape and head may take place within the housing (for example, a mid tape load design), or the storage tape may be directed away from the housing to an adjacent area at which the read/write head is located (for example, a helical drive design or a leader block design). Where the tape cartridge/drive system is designed to direct the storage tape away from the housing, a single tape reel configuration is normally employed. Conversely, where the tape cartridge/drive system is designed to provide head-storage tape interaction within or very near the housing, a two-tape reel configuration is typically utilized.

Regardless of the number of tape reels associated with a particular data storage tape cartridge, assembly of the tape reel within the housing is relatively similar. As a starting point, the tape reel normally includes a hub and opposing flanges. The flanges are disposed at opposite ends of the hub, and are spaced to approximate a height of the storage tape. Once assembled, the tape reel is then disposed within the housing. One common construction method is to first secure a hub pin to a portion of the housing, for example, the cover. More particularly, the hub pin is positioned to extend in a generally perpendicular fashion from an interior surface of the cover. The tape reel is then placed over the hub pin. In this regard, an axial bore is normally formed in the hub. The axial bore has a diameter slightly greater than a diameter of the hub pin such that the hub, and thus the tape reel, is free to rotate about the hub pin. During use, a portion of the tape drive engages a portion of the hub, via an opening in the base, and rotates the hub and thus the tape reel. For example, an exterior surface of the tape reel may include teeth which are sized to be engaged by a reciprocally toothed portion of the tape drive.

While allowing for rotation of the tape reel during use is an obvious necessity, it is equally important that the tape reel remain relatively stationary when the data storage tape cartridge is not in use. If the tape reel is allowed to freely rotate when not otherwise engaged by the tape drive, the storage tape may become loose within the housing. This is a highly undesirable situation in that the storage tape may be permanently displaced from the desired tape path, crease or otherwise become damaged. Under these circumstances, data may be lost or the data storage tape cartridge rendered unusable.

In light of the above concern, data storage tape cartridges are currently designed to include a locking mechanism or brake with the tape reel. When the data storage tape cartridge is not in use, the locking mechanism prevents the tape reel from rotating about the hub pin. During use, however, the locking mechanism is disengaged such that the tape reel can be rotated by the tape drive. One common type of locking mechanism includes a compression spring associated with the tape reel. When the data storage tape cartridge is not being used, the compression spring biases a portion of the tape reel into engagement with the base. In this engaged position, the tape reel is effectively "locked" to the base. During use, a chuck portion of the tape drive presses against the tape reel with a force sufficient to overcome the bias of the compression spring. As a result, the tape drive moves the locking mechanism away from engagement with the base such that the tape reel is free to rotate.

While the above-described braking mechanism does address the problem of undesired tape reel rotation during periods of non-use, other concerns still remain. In conjunction with advancements in tape drive and read/write head technology, various improvements in the data storage tape cartridge design have greatly enhanced performance capabilities. For example, evolution of magnetic tape media has resulted in storage tapes with increased storage capability and product longevity. Similarly, improvements in read/write head technology has resulted in the ability to read and write larger volumes of information on increasingly smaller tracks defined along the height of the storage tape. While these efforts are clearly beneficial, greater demands are placed on the data storage tape cartridge design. For example, with the use of smaller information tracks, the data storage tape cartridge must be configured to maintain the desired tape path within an extremely tight tolerance range. Any slight deviation in the desired tape path may result in reading/writing errors.

There are several possible causes of tape path deviation following construction of the data storage tape cartridge. One common type occurs where the hub pin is forced out of the preferred perpendicular relationship with the cover. For example, when a user accidentally drops the data storage tape cartridge, the resulting impact may cause a deflection in the hub pin. While obviously not advised, accidental dropping or other unexpected impacts on the data storage tape cartridge can and will occur. When the hub pin is forced to a different orientation relative to the cover, the tape reel, otherwise disposed about the hub pin, likewise changes its position. Consequently, the tape path generated by the position of the tape reel within the housing will change. Even a slight change in the angular position of the tape reel may result in reading and writing errors.

Data storage tape cartridges are important tools used to maintain vast amounts of information. However, with increasing complex reading/writing and magnetic tape technology, design of the data storage tape cartridge must evolve to prevent deflection of the hub pin, and thus any resulting errors, when the data storage tape cartridge is accidentally dropped or otherwise impacted. Therefore, a need exists for a data storage tape cartridge having a tape reel assembly designed to reinforce the hub pin.

SUMMARY OF THE INVENTION

One preferred embodiment of the present invention provides a data storage tape cartridge that includes a housing, a hub pin, a tape reel assembly and a storage tape. The housing is defined by a first housing section and a second housing section. The first and second housing sections mate with one another, forming an enclosure within which various other components of the data storage tape cartridge are maintained. The hub pin is attached to an interior surface of the first housing section, extending in a generally perpendicular fashion. The tape reel assembly includes a hub, a first tape flange, a second tape flange and a brake. The hub includes a tape receiving portion interiorly secured to a post, the post defining an axial bore sized to receive the hub pin. The first tape flange is disposed adjacent a first axial end of the hub; whereas the second tape flange is disposed adjacent a second axial end of the hub. The brake is retractably associated with the first axial end of the hub and includes a braking surface and an interior support surface. The braking surface is configured for selective engagement with the second housing section. The interior support surface is configured to abut the post of the hub. Finally, the storage tape is maintained by the tape receiving portion of the hub.

The above-described data storage tape cartridge is assembled by first securing the hub pin to the interior surface of the first housing section. The tape reel assembly is then rotatably associated with the hub pin. In particular, the hub pin is received within the axial bore of the hub. The storage tape is then wrapped about the tape receiving portion of the hub. Finally, the second housing section is secured to the first housing section.

During use, the brake is retractable from a first, locked position to a second, released position. In the locked position, the braking surface of the brake engages the second housing section and prevents the hub from rotating. Conversely, in the released position, the brake is biased away from the second housing section such that the hub is free to rotate about the hub pin. Importantly, in at least the locked position, the interior support surface of the brake abuts the post of the hub. With this abutting relationship, the brake effectively reinforces the post, and thus the hub pin otherwise disposed within the axial bore of the post. As a result, the brake restricts side-to-side movement of the hub pin, thereby preventing undesired deflection of the hub pin when the data storage tape cartridge is unexpectedly impacted.

Another aspect of the present invention relates to a tape reel assembly for use with a data storage tape cartridge. The data storage tape cartridge includes a housing defined by a base and a cover, a hub pin extending in a generally perpendicular fashion from an interior surface of the cover and a storage tape maintained within the housing. The tape reel assembly comprises a hub, an upper flange, a lower flange and a locking device. The hub defines a top portion and a bottom portion, and includes a post and a tape receiving portion. The post defines an axial bore sized to receive the hub pin. The upper flange is attached to the top portion of the hub. The lower flange is attached to the bottom portion of the hub. The locking device includes a brake body and a biasing means. The brake body is preferably a disc forming an engagement surface along an outer circumference of the disc and a support surface at an inner diameter of the disc. The biasing means, which in one preferred embodiment is a compression spring, retractably associates the brake body with the top portion of the hub. The support surface contacts the post of the hub, providing support thereto.

Upon placement of the tape reel assembly into the housing, the locking mechanism is retractable from a first, locked position to a second, released position. In the locked position, the engagement surface of the brake body engages the base. Additionally, the support surface of the brake abuts the post. Thus, in the locked position, the brake body prevents rotation of the hub. Additionally, in the locked position, the brake body connects the post to the base, such that the post is supported or reinforced by the brake body. In the released position, the engagement surface of the brake disengages from the base. As a result the hub freely rotates about the hub pin.

DETAILED DESCRIPTION OF THE PREFERRED EMBODIMENTS

Figure 1:
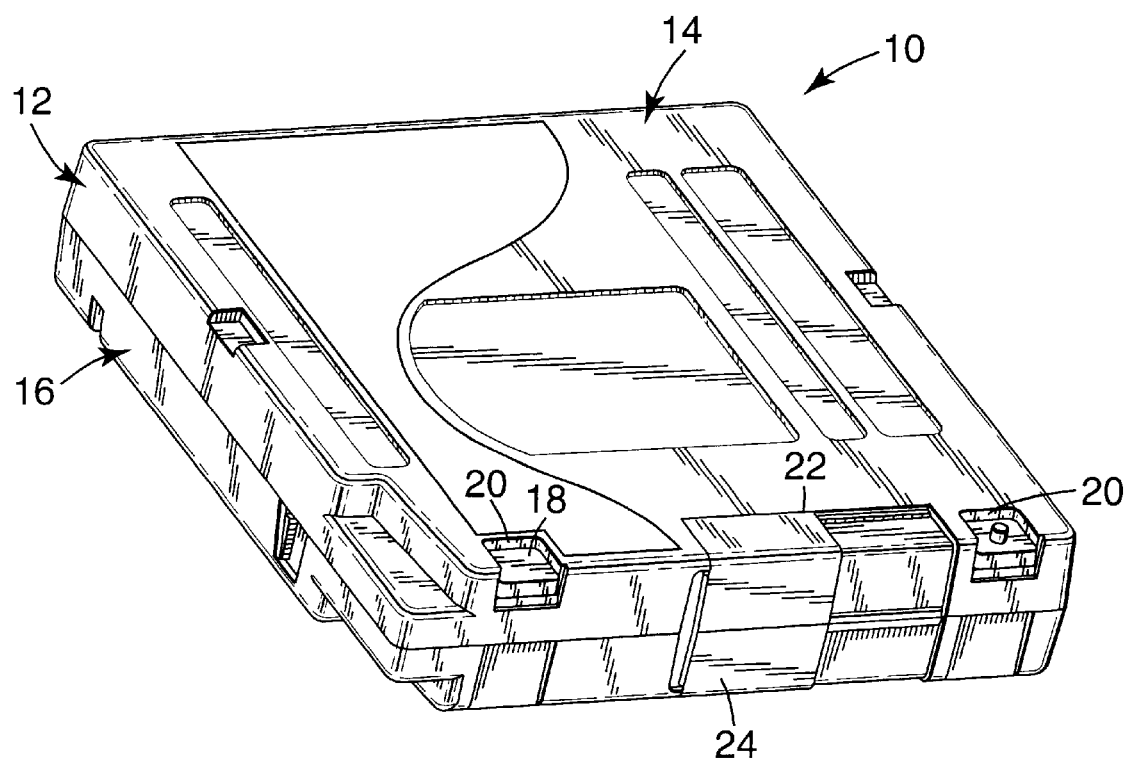
FIG. 1 is a perspective view of a data storage tape cartridge.

One preferred embodiment of a data storage tape cartridge 10 is shown in FIG. 1. Generally speaking, the data storage tape cartridge 10 includes a housing 12 defined by a first housing section 14 and a second housing section 16. The data storage tape cartridge 10 further includes a base plate 18, a portion of which is exposed through recesses 20 in the first housing section 14. Remaining components of the data storage tape cartridge 10 are described in greater detail below. However, with reference to FIG. 1, it should be understood that the first housing section 14 and the second housing section 16 are reciprocally mated to one another and form an enclosure within which the various other components, including the base plate 18, are maintained.

The housing 12 is preferably sized to be received by a typical tape drive (not shown). Thus, the housing 12 may be sized for use within a 5.25 inch (130 mm) form factor drive, a 3.5 inch (90 mm) form factor drive, or other useful sizes. Further, the first housing section 14 and the second housing section 16 combine to form a window 22 through which storage tape otherwise maintained within the housing 12 can be accessed by a read/write head (not shown). To this end, the data storage tape cartridge 10 includes a door 24. The door 24 is slidably secured to the housing 12 such that the door 24 can be selectively moved to provide access to the window 22. The door 24 is biased or spring-loaded to a closed position to protect storage tape (not shown) otherwise maintained in the housing 12 from contamination when the data storage tape cartridge 10 is not in use.

In a preferred embodiment, the first housing section 14 is a cover, whereas the second housing section 16 is a base. With reference to the orientation shown in FIG. 1, the data storage tape cartridge 10 is normally inserted into a drive (not shown) with the cover 14 facing upward. It should be recognized, however, that the data storage tape cartridge 10 can be orientated to any position. Further, the design of the data storage tape cartridge 10 can be such that the first housing section 14 forms a base, whereas the second housing section 16 is a cover.

Figure 2:
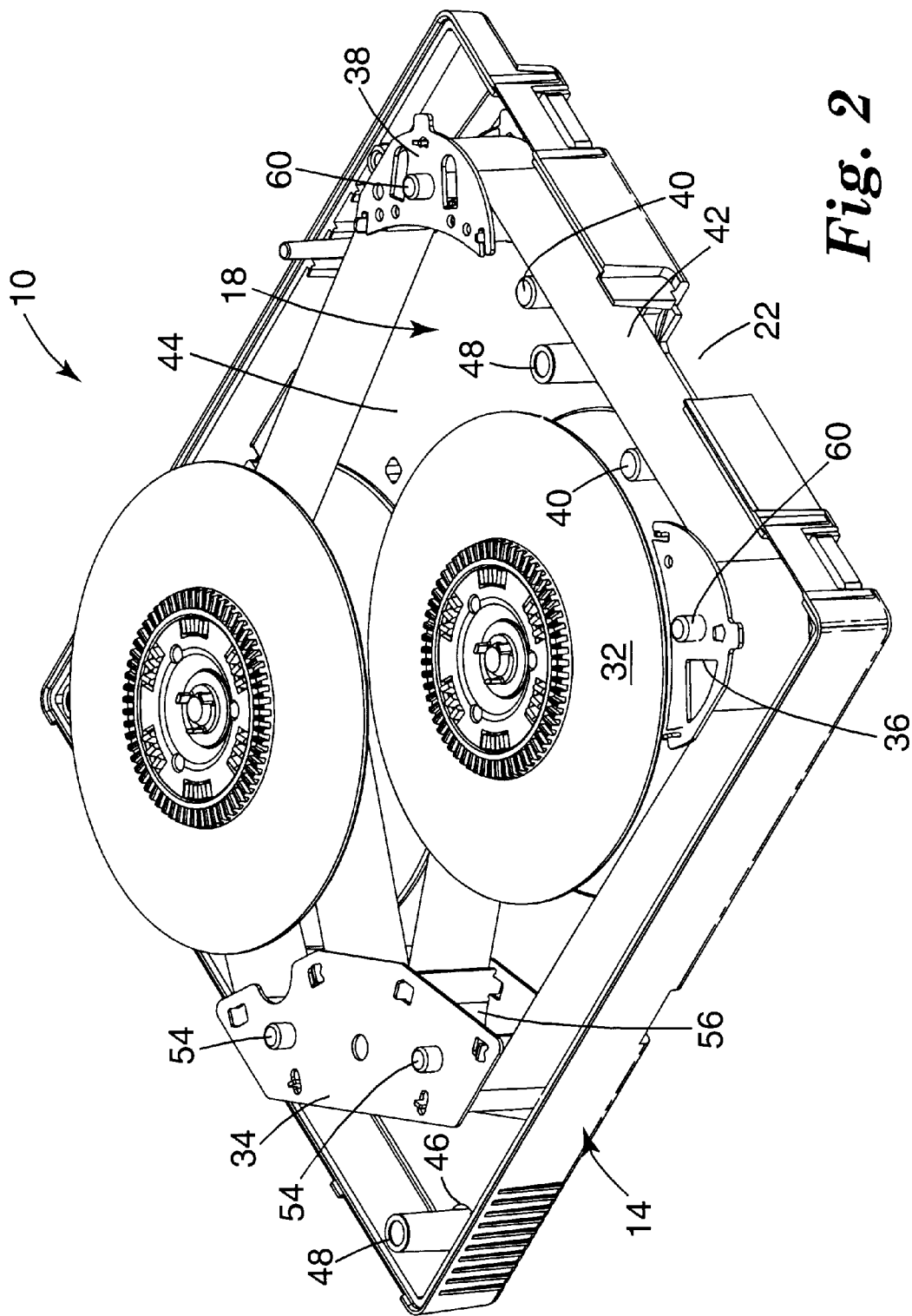
FIG. 2 is a perspective view of the data storage tape cartridge of FIG. 1, with a portion of the housing removed.

Remaining components of the data storage tape cartridge 10 are shown in FIG. 2. Notably, for ease of illustration, FIG. 2 depicts the first housing section 14 in an inverted position, and the second housing section 16 (FIG. 1) removed. With this orientation in mind, the data storage tape cartridge 10 includes the base plate 18, a first tape reel assembly 30, a second tape reel assembly 32, a first corner guide 34 (idler bearing), a second corner guide 36 (d-bearing), a third corner guide 38 (d-bearing), pin guides 40 (head wrap pins) and a storage tape 42. As described in greater detail below, the first tape reel assembly 30 and the second tape reel assembly 32 are rotably secured about respective hub pins (not shown) extending from an interior surface 44 of the base plate 18. The remaining guides 34–40 are secured to the interior surface 44 of the base plate 18.

In a preferred embodiment, the base plate 18 is made of a rigid material, such as aluminum. The base plate 18 is sized to nest within the first housing section 14 and includes recesses 46 positioned to allow passage of various protrusions 48 in the first housing section 14. The protrusions 48 are configured to frictionally receive extensions (not shown) of the second housing section 16 (FIG. 1).

The first tape reel assembly 30 and the second tape reel assembly 32 are described in greater detail below. In general terms, however, the tape reel assemblies 30, 32 are virtually identical and are positioned to rotate relative to the base plate 18 about the respective hub pins (not shown).

The first corner guide 34 is secured to the base plate 18 by pins 54 and includes a first arcuate surface 56 (shown partially in FIG. 2) and a second arcuate surface (not shown). The second corner guide 36 and the third corner guide 38 are similarly secured to the base plate 18 by pins 60 and likewise each provide an arcuate surface. The pin guides 40 are positioned on the base plate 18 adjacent the window 22.

Finally, the storage tape 42 is preferably a magnetic tape of a type commonly known in the art. For example, the storage tape 42 may consist of a balanced polyethylene naphthalate (PEN) based material coated on one side with a layer of magnetic dispersed within a suitable binder system, and on the other side with a conductive material dispersed within a suitable binder system. Acceptable tape is available, for example, from Imation Corp., of St. Paul, Minn.

As shown in FIG. 2, the above components combine to define a tape path for the storage tape 42. In particular, the storage tape 42 extends from the first tape reel assembly 30, articulates around the first arcuate surface 56 of the first corner guide 34, then extending to the second guide 36 and the third corner guide 38. Notably, the pin guides 40 maintain a planar positioning of the storage tape 42 at the window 22. From the third corner guide 38, the storage tape 42 articulates about an exterior portion of the second tape reel assembly 32, extends to the second arcuate surface (not shown) of the first corner guide 34 and is finally wrapped around the second tape reel assembly 32. It will be recognized by one of skill in the art that the above-described tape path is but one of many available configurations. By incorporating different guides at varying locations, the resulting tape path may be substantially different from that shown in FIG. 2.

Figure 3:
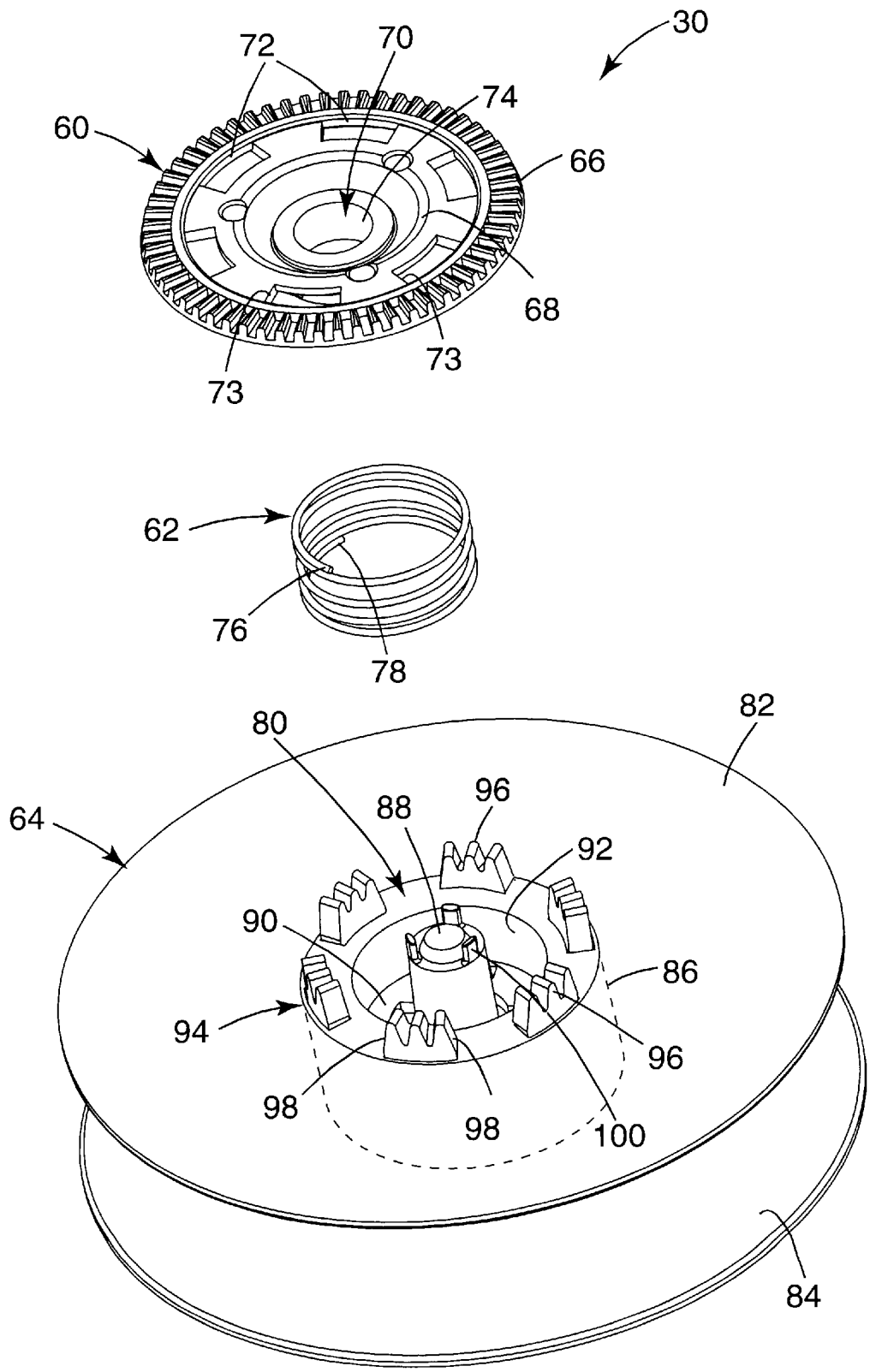
FIG. 3 is an exploded view of a tape reel assembly of the data storage tape cartridge in accordance with the present invention.

FIG. 3 depicts the first tape reel assembly 30 in greater detail. While not shown, the second tape reel assembly 32 (FIG. 2) is identical in construction. In one preferred embodiment, the first tape reel assembly 30 includes a brake 60, a biasing means 62 and a tape reel 64. As described in greater detail below, the brake 60 and the biasing means 62 are retractably disposed within a portion of the tape reel 64.

The brake 60 is preferably a disc-shaped body having a braking surface 66, a central portion 68 and an interior support surface 70. The braking surface 66 is formed about an outer circumference of the brake 60, and preferably is in the form of a plurality of teeth. The central portion 68 extends radially inwardly from the braking surface 66 and forms a plurality of passages 72. Each of the plurality of passages 72 is defined by opposing radial walls 73. Finally, the interior support surface 70 is formed at an interior diameter of the brake 60. In a preferred embodiment, the interior support surface 70 is a ring forming an axial abutment surface 74. As described in greater detail below, the interior support surface 70 has a diameter slightly greater than a diameter of a portion of the tape reel 64.

The brake 60 is preferably an integrally formed body. Alternatively, the various components of the brake 60 can be manufactured separately and subsequently assembled. In one preferred embodiment, the brake 60 is molded from a plastic material. Alternatively, other rigid materials, such as aluminum or stainless steel, are also available.

The biasing means 62 is preferably a compression spring having a first end 76 and a second end 78. The first end 76 is sized to abut the central portion 68 of the brake 60. Conversely, the second end 78 is sized to be received and maintained by a portion of the tape reel 64. Although the biasing means 62 is described as preferably being a spring, other forms are acceptable. For example, the biasing means 62 may be a pneumatic device, a biasing hinge, etc. Even further, the brake 60 can be associated with the tape reel 64 so as to eliminate the biasing means 62 entirely.

The tape reel 64 includes a hub 80, a first tape flange 82 and a second tape flange 84. Notably, with respect to the orientation shown in FIG. 3, the first tape flange 82 can be referred to as an upper flange, whereas the second tape flange 84 can be referred to as a lower flange. It should be understood, however, that use of the terms "upper" and "lower" is for clarity only, and that the data storage tape cartridge 10 (FIG. 1), and thus components of the tape reel 64, may actually be oriented in any direction relative to the world in general. In one preferred embodiment, the hub 80 is manufactured separately from the upper flange 82 and the lower flange 84, which are subsequently attached to the hub 80. Alternatively, the hub 80 and the flanges 82, 84 can be integrally formed.

The hub 80 includes a tape receiving portion 86 (a majority of which is shown with dashed lines in FIG. 3) and a post 88. The tape receiving portion 86 is interiorly attached to the post 88 by a web 90. As shown in FIG. 3, a brake receiving zone 92 is defined between the tape receiving portion 86 and the post 88, and the web 90.

The tape receiving portion 86 is preferably cylindrical, having an outer circumference formed to receive the storage tape 42 (FIG. 2). Further, a driving means 94 is formed at an upper end of the tape receiving portion 86. In one preferred embodiment, the driving means 94 is a plurality of sets of teeth 96. As shown in FIG. 3, each of the plurality of sets of teeth 96 is spaced from one another, and extends in an axial-fashion from a top surface of the tape receiving portion 86. Each of the plurality of sets of teeth 96 form opposing contact surfaces 98. Notably, the plurality of sets of teeth 96 need not necessarily extend from the tape receiving portion 86, but instead can be positioned anywhere along the hub 80, or even the upper flange 82. Each of the plurality of sets of teeth 96 has an arc length and width slightly less than an arc length and width of each of the plurality of passages 72 in the brake 60. Thus, upon final assembly, each one of the plurality of sets of teeth 96 is sized to pass through one of the plurality of passages 72 such that the brake 60 can nest within the brake receiving zone 92 of the hub 80.

The post 88 is preferably a cylinder having an outer diameter slightly less than an inner diameter of the interior support surface 70 of the brake 60. The post 88 includes bendable tabs 100 extending from an upper surface thereof. The bendable tabs 100 are selectively moveable from a position parallel with an axis of the post 88 to a position perpendicular to the axis of the post 88. Finally, the post 88 defines an axial bore (not shown) extending within the post 88. As described in greater detail below, the axial bore is sized to receive a hub pin for placement of the tape reel assembly 30 within the housing 12 (FIG. 1).

The tape reel 64 is assembled by securing the first flange 82 and the second tape flange 84 to the hub 80. In this regard, the first tape flange 82 and the second tape flange 84 are spaced along the hub 80 to accommodate a height of the storage tape 42 (FIG. 2). The hub 80 and the flanges 82, 84 are preferably made of a relatively rigid plastic material, although other materials, such as stainless steel, aluminum, etc. are also available.

The tape reel assembly 30 is constructed by first placing the biasing means 62 within the brake receiving zone 92 of the hub 80. In this position, the second end 78 of the biasing means 62 is secured against the web 90 of the hub 80. The brake 60 is then placed over the biasing means 62 such that the first end 76 of the biasing means 62 contacts the brake 60. The brake 60 is then orientated so that the plurality of passages 72 of the brake 60 align with the plurality of sets of teeth 96 of the hub 80. The brake 60 is then forced downwardly (relative to the orientation of FIG. 3) into the break receiving zone 92 of the hub 80.

Figure 4:
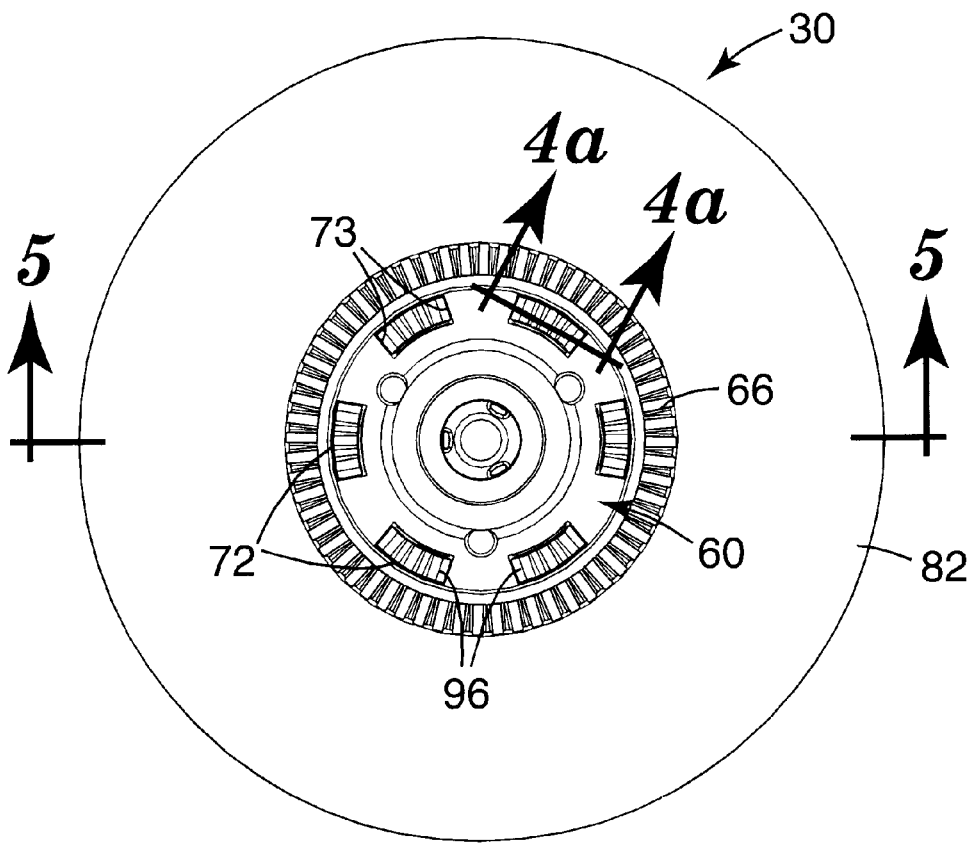
FIG. 4 is a top view of the tape reel assembly in accordance with the present invention.
Figure 4A:
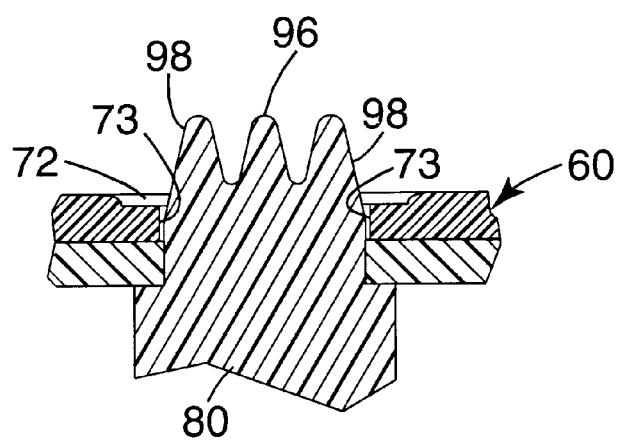
FIG. 4A is a partial cross-sectional view of the tape reel assembly in accordance with the present invention along the line A—A of FIG. 4.

The relationship between the plurality of passages 72 and the plurality of sets of teeth 96 is shown best in FIG. 4. Once again, each of the plurality of passages 72 is sized to selectively receive and allow passage of one of the plurality of sets of teeth 96. Therefore, as shown in FIG. 4, the teeth 96 can extend through the passages 72 upon final assembly. It should be noted that while each of plurality of passages 72 is sized to allow passage to one of the plurality of sets of teeth 96, selective contact between the brake 60 and the plurality of sets of teeth 96 will preferably occur. This relationship is shown more clearly in FIG. 4A which depicts a cross-sectional view of one of the sets of teeth 96 extending through one of the passages 72 in the brake 60. The opposing radial walls 73 of the passage 72 can selectively engage the opposing contact surfaces 98 of the teeth 96. Thus, where the brake 60 is in a locked position and an attempt is made to rotate the hub 80, one of the opposing contact surfaces 98 of the hub 80 will engage a respective one of the opposing radial walls 73. Because the brake 60, and thus the opposing radial walls 73, is locked, this engagement prevents the hub 80 from further rotating. Conversely, where the brake 60 is in a released position, rotation of the hub 80 imparts a rotational movement onto the brake 60 via interaction between one of the opposing contact surfaces 98 of the teeth 96 and the respective one of the opposing radial walls 73 of the brake 60. Thus, in the released position, the brake 60 rotates with rotation of the hub 80.

Figure 5:
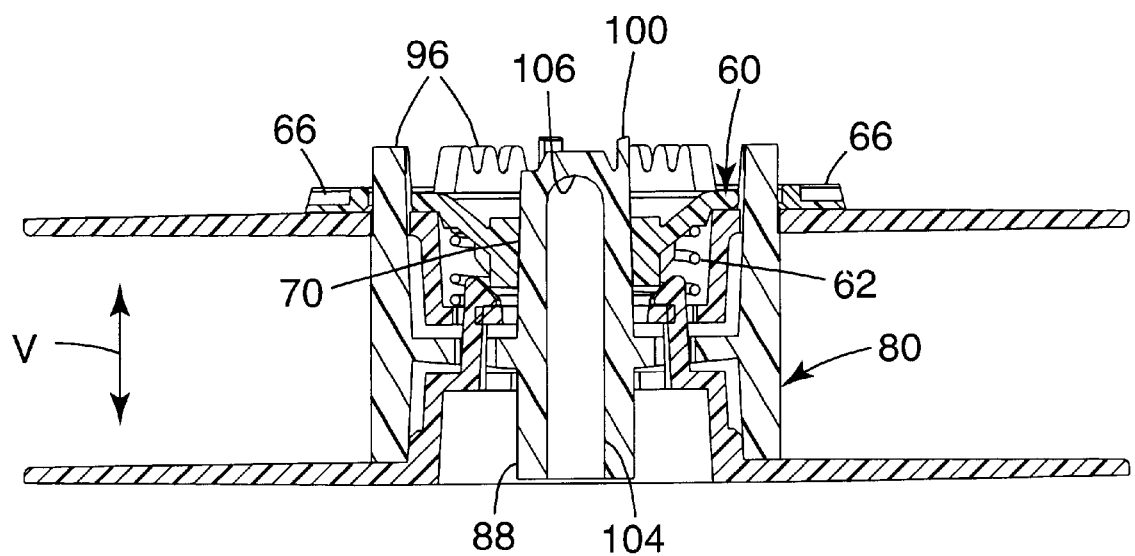
FIG. 5 is a cross-sectional view of the tape reel assembly in accordance with the present invention along the line 5—5 of FIG. 4.

As shown in FIG. 5, the brake 60 is slidably associated with the hub 80 in a generally vertical direction, shown by the arrow V. In this regard, the biasing means 62 biases the brake 60 from a released or retracted position (shown in FIG. 5) to a locked or extended position in which the braking surface 66 of the brake 60 extends axially upward (with reference to the orientation shown in FIG. 5). Notably, FIG. 5 depicts one of the bendable tabs 100 for maintaining the brake 60. After placing the brake 60 over the hub 80 and then extending the bendable tabs 100, the bendable tabs 100 prevent the brake 60 from disengaging the hub 80 entirely, although the brake 60 is still free to slide along the hub 80 in the direction V.

FIG. 5 shows the axial bore 104 formed within the post 88. The axial bore 104 extends from a bottom of the post 88, terminating at a radial wall 106. Thus, the axial bore 104 has a height defined between the bottom of the post 88 and the radial wall 106.

Upon final assembly, the interior support surface 70 of the brake 60 abuts an outer circumference of the post 88. In a preferred embodiment, at least a portion of the interior support surface 70 abuts an outer circumference of the post 88 between the radial wall 106 and the bottom of the post 88. Regardless of exact position, the interior support surface 70 of the brake 60 abuts opposite sides of the post 88. Importantly, the area of abutment or contact between the interior support surface 70 of the brake 60 and the post 88 of the hub 80 does not prevent the desired vertical sliding movement (or retraction) of the brake 60 relative to the hub 80.

Figure 6:
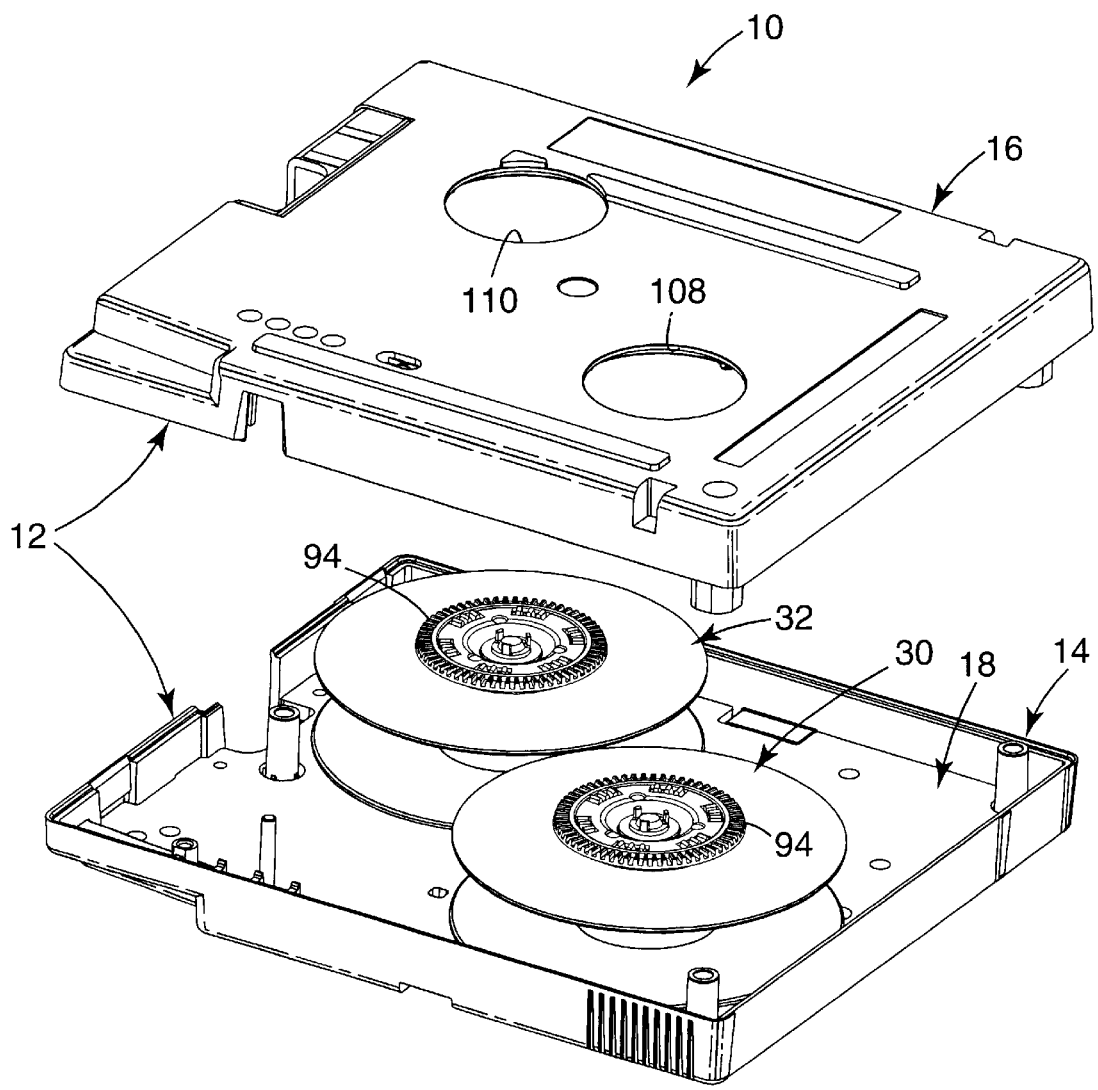
FIG. 6 is an exploded view of the tape cartridge, showing assembly of the housing.

Construction of the tape reel assemblies 30, 32 within the housing 12 is shown generally in FIG. 6. As described in greater detail below, the first and second tape reel assemblies 30, 32 are positioned over respective hub pins (not shown). The hub pins extend from the base plate 18, otherwise nesting within the first housing section (or cover) 14. Other components, such as the various guides 34–40 (FIG. 2) are also assembled to the base plate 18. The storage tape 42 (FIG. 2) is articulated through the previously described tape path. The second housing section (or base) 16 is then secured to the cover 14. In this regard, the base 16 includes first and second openings 108, 110 sized to provide access to the first and second tape reel assemblies 30, 32, respectively. Upon insertion of the data storage tape cartridge 10 into a tape drive (not shown), a driving system (not shown) of the tape drive can contact the driving means 94 of the tape reel assemblies 30, 32 to impart a rotational force thereto.

Figure 7:
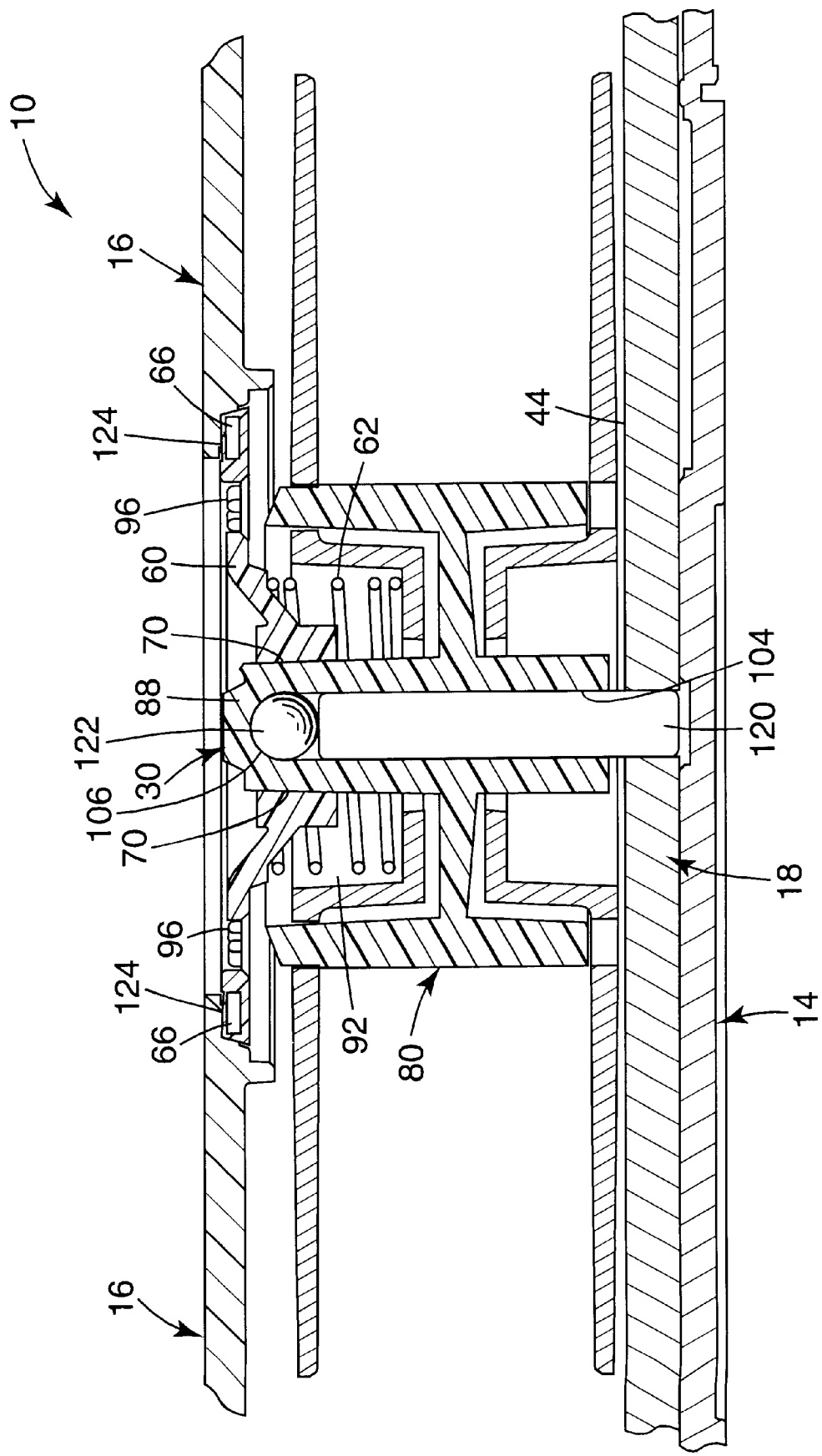
FIG. 7 is a sectional view of the data storage tape cartridge depicting placement of the tape reel assembly.

Construction and operation of the first tape reel assembly 30 is shown in greater detail in FIG. 7. Once again, while FIG. 7 only depicts the first tape reel assembly 30, it should be understood that the second tape reel assembly 32 (FIG. 6) functions in an identical manner. As a starting point, FIG. 7 depicts the hub pin 120 extending from the base plate 18. As previously described, the base plate 18 nests against the first housing section (or cover) 14. In this regard, the hub pin 120 extends in a generally perpendicular fashion from the interior surface 44 of the base plate 18. The first tape reel assembly 30 is disposed over the hub pin 120 via placement of the hub pin 120 within the axial bore 104 of the post 88. Further, in one preferred embodiment, a spherical spacer 122 is provided. The spherical spacer 122 is positioned within the axial bore 104, between the radial wall 106 and the hub pin 120. The spherical spacer 122, while not a required element, accounts for variations in the extension of the hub pin 120, as well as providing an improved thrust surface.

As shown in FIG. 7, the tape reel assembly 30 is maintained over the hub pin 120 by the base 16. The biasing means 62 biases the brake 60 upwardly (with respect to the orientation shown in FIG. 7) such that the braking surface 66 engages an interior surface 124 of the base 16. In a preferred embodiment, the interior surface 124 includes teeth sized to mate with the teeth (shown best in FIG. 3) of the braking surface 66. With this configuration, the biasing means 62 biases the brake 60 to a locked position. In the locked position, the brake 60 is "locked" relative to the base 16. The brake 60, in turn, "locks" the hub 80 via contact between the opposing radial walls 73 (FIG. 4A) of each of the plurality of passages 72 (FIG. 4) of the brake 60 with the opposing contact surfaces 98 (FIG. 4A) of each of the plurality of sets of teeth 96 of the hub 80. This relationship was previously described with reference to FIG. 4A. Thus, with the brake 60 locked to the base 16, the hub 80 will not rotate.

Additionally, in the locked position, the interior support surface 70 of the brake 60 fits tightly around the post 88. As shown in FIG. 7, the interior support surface 70 abuts the post 88 on opposite sides. Effectively then, the post 88 is connected to the base 16 via the brake 60. As a result, side-to-side movement of the hub 80 is restricted by the brake 60 in the locked position. It will be remembered that the post 88 is disposed over the hub pin 120 at the axial bore 104. Thus, in the locked position, the brake 60 reinforces the hub pin 120 by limiting side-to-side movement thereof. In a preferred embodiment, reinforcement of the hub pin 120 is augmented by configuring the brake 60 such that the interior support surface 70 abuts the post 88 below a height of the hub pin 120 within the axial bore 104. Possible damage to, or deflection of, the hub pin 120 which might otherwise occur in the event that the data storage tape cartridge 10 is dropped or impacted is virtually eliminated.

The brake 60 can be slidably retracted within the brake receiving zone 92 to an unlocked position (FIG. 5) by placement of an axial force upon the brake 60. For example, the driving mechanism (not shown) of the tape drive (not shown) has a protrusion which acts upon the brake 60, forcing it into the unlocked position. In the unlocked position, the braking surface 66 is released from engagement with the toothed surface 124 of the base 16. In the unlocked position, the hub 80 is free to rotate about the hub pin 120. Notably, due to selective engagement between the opposing contact surfaces 98 (FIG. 4A) of the plurality of sets of teeth 96 of the hub 80 and the opposing radial walls 73 (FIG. 4A) of the brake 60, the brake 60 will rotate upon rotation of the hub 80. Once again, this relationship has previously described with reference to FIG. 4A. This feature eliminates relative motion between the driving mechanism and the brake 60, which might otherwise generate undesirable debris. In other words, the brake 60, via the hub 80, rotates with rotation of the driving mechanism. While the interior support surface 70 of the brake 60 is shown as preferably remaining in contact with the post 88 in the unlocked position, this relationship is not required.

The data storage tape cartridge having a reinforcing tape reel lock of the present invention provides a marked improvement over previously used designs. The brake body associated with the tape reel of the present invention not only prevents undesired rotation of the tape reel assembly, but also supports the hub, and thus reinforces the hub pin, in the event of an unexpected impact. By providing this support, potentially catastrophic hub pin deflection is prevented.

Although the present invention has been described with reference to preferred embodiments, workers skilled in the art will recognize that changes may be made in form and detail without departing from the spirit and scope of the invention. For example, the data storage tape cartridge has been described as preferably including a base plate nesting within the first housing section (or cover). The base plate, however, is not a required element. Instead, the hub pin can be secured to the interior surface of the first or second housing section. Similarly, while the data storage tape cartridge has been shown as preferably incorporating a dual tape reel design, the reinforced brake of the present invention applies equally as well to a single tape reel design.

Further, while the brake has been described as an integrally formed disc, other shapes are available. Additionally, the interior support surface of the brake need not necessarily be a ring, but instead can be a series of spaced support fingers sized to contact the post of the hub on opposite sides. Finally, the brake can be a combination of structures that individually perform the functions of reinforcing the hub pin and selectively prevent rotation of the tape reel.

What is claimed:

1. A data storage tape cartridge comprising:
   a housing defining a first housing section and a second housing section;
   a hub pin extending in a generally perpendicular fashion from an interior side of the first housing section;
   a tape reel assembly rotatably associated with the hub pin, the tape reel assembly comprising:
      a hub including a tape receiving portion interiorly secured to a post, the post defining an axial bore sized to receive the hub pin,
      a first tape flange disposed adjacent a first axial end of the hub,
      a second tape flange disposed adjacent a second axial end of the hub, and
      a brake body retractably associated with the first axial end of the hub, the brake body including a braking surface for selective engagement with the second housing section, a central portion and an interior support surface configured to abut the post, the interior support surface having an axial length greater than a maximum axial thickness of the central portion; and
   a storage tape maintained by the tape receiving portion of the hub.

2. The data storage tape cartridge of claim 1, wherein the interior support surface is configured to restrict side-to-side movement of the hub pin.

3. The data storage tape cartridge of claim 1, wherein the tape reel assembly further includes biasing means for biasing the brake body to a position whereby the braking surface engages the second housing section.

4. The data storage tape cartridge of claim 3, wherein the biasing means is a spring disposed between the brake body and a radial shoulder of the hub.

5. The data storage tape cartridge of claim 1, wherein the interior support surface of the brake body is a ring having an inner diameter approximating an outer diameter of the post.

6. The data storage tape cartridge of claim 1, wherein the interior support surface of the brake body is configured to abut the post on opposite sides.

7. The data storage tape cartridge of claim 6, wherein at least a portion of the interior support surface abuts the post adjacent the hub pin.

8. The data storage tape cartridge of claim 1, wherein the hub pin extends within the axial bore from the second axial end of the hub to an end point, and further wherein at least a portion of the interior support surface of the brake body abuts the post between the end point and the second axial end.

9. The data storage tape cartridge of claim 1, wherein the axial bore extends from the second axial end of the hub and terminates within the post at a radial wall, the brake body being configured such that at least a portion of the interior support surface extends along the post to a location between the radial wall and the second axial end.

10. The data storage tape cartridge of claim 1, wherein the interior support surface of the brake body is configured to coaxially receive the post of the hub in an axially sliding fashion.

11. The data storage tape cartridge of claim 1, wherein the brake body is configured to engage a portion of the hub apart from the interior support surface such that the brake body rotates with rotation of the hub.

12. The data storage tape cartridge of claim 11, wherein the hub further includes a contact surface extending from the first axial end and the brake body further defines a passage sized to receive the contact surface such that upon rotation of the hub, the contact surface imparts a rotational force on the brake body at the passage.

13. The data storage tape cartridge of claim 1, wherein the hub further includes a driving means positioned at the first axial end, and further wherein the brake body includes a passage sized to receive the driving means upon axial displacement of the brake body relative to the hub.

14. The data storage tape cartridge of claim 13, wherein the passage is formed in the central portion, and further wherein the driving means is a toothed surface extending from the first axial end of the tape receiving portion of the hub.

15. The data storage tape cartridge claim 1, wherein the brake body is retractable from a locked positioned to a released position, whereby in the locked position, the brake body engages the second housing section to prevent rotation of the hub, and further whereby in the released position, the brake body disengages the second housing section to allow rotation of the hub.

16. The data storage tape cartridge of claim 15, wherein the brake body is configured such that in the locked position, the brake body is in contact with the second housing section and the post.

17. A tape reel assembly for use with a data storage tape cartridge, the data storage tape cartridge including a housing defined by a base and a cover, a hub pin extending in a generally perpendicular fashion from an interior surface of the cover and a storage tape maintained within the housing, the tape reel assembly comprising:

a hub defined by a top portion and a bottom portion, the hub including a post and a tape receiving portion, the post defining an axial bore sized to receive the hub pin;

an upper flange attached to the top portion of the hub;

a lower flange attached to the bottom portion of the hub; and a locking mechanism comprising:

a brake retractably associated with the top portion of the hub, the brake defining a braking surface along an outer circumference of the brake, a central portion and a support surface formed at an inner diameter of the brake, the support surface having an axial length greater than a maximum axial thickness of the central portion and configured to abut the post of the hub for supporting the post, and biasing means for biasing the brake away from the bottom portion of the hub.

18. The tape reel assembly of claim 17, wherein at least a portion of the support surface of the brake contacts the post adjacent the axial bore.

19. The tape reel assembly of claim 17, wherein the axial bore extends from the bottom portion of the hub and terminates at a radial wall, and further wherein the support surface defines an axial length, the brake being positioned such that at least a portion of the axial length of the support surface is located along the post between the radial wall and the bottom portion of the hub.

20. The tape reel assembly of claim 17, wherein the brake is retractable from a locked position to a released position, whereby in at least the locked position, the support surface abuts the post on opposite sides.

21. The tape reel assembly of claim 17, wherein the hub includes a contact surface extending from the top portion of the hub, and further wherein the central portion of the brake forms a passage sized to receive the contact surface, the passage being defined by opposing radial walls such that the contact surface imparts a force on at least one of the opposing radial walls upon rotation of the hub.

* * * * *